(12) United States Patent
Murakami et al.

(10) Patent No.: US 9,608,734 B2
(45) Date of Patent: Mar. 28, 2017

(54) OPTICAL TRANSMISSION SYSTEM, OPTICAL RECEPTION APPARATUS, AND SIGNAL ADJUSTMENT METHOD

(71) Applicant: FUJITSU LIMITED, Kawasaki-shi, Kanagawa (JP)

(72) Inventors: Makoto Murakami, Kawasaki (JP); Noriaki Mizuguchi, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/878,245

(22) Filed: Oct. 8, 2015

(65) Prior Publication Data
US 2016/0142152 A1 May 19, 2016

(30) Foreign Application Priority Data
Nov. 18, 2014 (JP) ................................. 2014-234026

(51) Int. Cl.
*H04J 14/02* (2006.01)
*H04B 10/61* (2013.01)
*H04B 10/296* (2013.01)
*G02B 6/293* (2006.01)

(52) U.S. Cl.
CPC ........ *H04B 10/616* (2013.01); *H04J 14/0221* (2013.01); *G02B 6/2938* (2013.01); *H04B 10/296* (2013.01)

(58) Field of Classification Search
CPC .. H04B 10/616; H04B 10/612; H04B 10/613; H04B 10/614; H04B 10/615; H04B 10/61; H04B 10/0795; H04B 10/6151; H04B 10/564; H04B 10/506; H04B 10/296; H04J 14/0221; H04J 14/02; H04J 14/06; H04J 14/0254; G02B 6/2938
USPC ............................................................ 398/79
See application file for complete search history.

(56) References Cited

U.S. PATENT DOCUMENTS 6,147,785 A * 11/2000 Mizrahi ................. H04B 10/85
398/1
6,304,347 B1 * 10/2001 Beine .................... H04B 10/077
398/1
7,085,043 B2 * 8/2006 Takeyama ........... H01S 3/06758
359/337.1

(Continued)

FOREIGN PATENT DOCUMENTS

JP 2013-38745 2/2013

*Primary Examiner* — Ken N Vanderpuye
*Assistant Examiner* — Abbas H Alagheband
(74) *Attorney, Agent, or Firm* — Staas & Halsey LLP

(57) ABSTRACT

An optical transmission system includes: a reception apparatus configured to receive signal light separated from wavelength division multiplexing light; and a management apparatus configured to manage a plurality of optical transmission apparatuses that transmit the wavelength division multiplexing light, wherein the reception apparatus further comprises: an amplification section configured to amplify each power of electric signals for demodulating the signal light within a predetermined tolerance level, the electric signals being converted from mixed light of local light and the signal light input into the reception apparatus; an adjustment section configured to adjust power of the signal light input into the reception apparatus or power of the local light; and a controller configured to control the adjustment section based on an adjustment amount notified by the management apparatus, the management apparatus includes a computer.

5 Claims, 10 Drawing Sheets

(56) References Cited

U.S. PATENT DOCUMENTS

| | | | | |
|---|---|---|---|---|
| 8,625,997 B2* | 1/2014 | Evans | H04J 14/0227 | 398/140 |
| 8,666,252 B2* | 3/2014 | Nishihara | H04J 14/0204 | 398/48 |
| 8,831,436 B2* | 9/2014 | Evans | H04B 10/073 | 398/162 |
| 9,048,956 B2* | 6/2015 | Suzuki | H04B 10/612 | |
| 9,100,139 B2* | 8/2015 | Schmidt | H04J 14/0258 | |
| 9,225,459 B2* | 12/2015 | Oda | H04J 14/0221 | |
| 9,287,992 B2* | 3/2016 | Fujita | H04B 10/572 | |
| 9,363,022 B2* | 6/2016 | Aoki | H04B 10/616 | |
| 9,391,421 B2* | 7/2016 | Okano | G02B 6/2938 | |
| 9,496,980 B2* | 11/2016 | Bhatnagar | H04J 14/0263 | |
| 2006/0087723 A1* | 4/2006 | Takeyama | H01S 3/06758 | 359/337 |
| 2010/0178057 A1* | 7/2010 | Shieh | H04L 25/0224 | 398/79 |
| 2011/0188851 A1* | 8/2011 | Oda | H04J 14/021 | 398/26 |
| 2012/0212800 A1* | 8/2012 | Nakata | H04B 10/293 | 359/337.11 |
| 2012/0237212 A1* | 9/2012 | Nishihara | H04J 14/0204 | 398/26 |
| 2013/0121691 A1* | 5/2013 | Oda | H04J 14/0221 | 398/34 |
| 2013/0148961 A1* | 6/2013 | Fujita | H04B 10/572 | 398/34 |
| 2013/0216232 A1* | 8/2013 | Zanoni | H04B 10/5055 | 398/79 |
| 2013/0259479 A1* | 10/2013 | Mizuguchi | H04B 10/2507 | 398/65 |
| 2015/0333862 A1* | 11/2015 | Swinkels | H04J 14/0227 | 398/79 |
| 2016/0094007 A1* | 3/2016 | Okano | G02B 6/2938 | 359/341.3 |

* cited by examiner

FIG. 11

| NUMBER OF INPUT CHANNELS OF OPTICAL AMPLIFIER BEFORE CHANNEL REMOVAL | NUMBER OF INPUT CHANNELS OF OPTICAL AMPLIFIER AFTER CHANNEL REMOVAL | GAIN VARIATION AMOUNT OF OPTICAL AMPLIFIER AFTER CHANNEL REMOVAL |
|---|---|---|
| 40 | 39 | $G_1''$ |
| 40 | 38 | $G_2''$ |
| ⋮ | ⋮ | ⋮ |
| 2 | 1 | $G_n''$ |

FIG. 12

| NUMBER OF INPUT CHANNELS OF OPTICAL AMPLIFIER BEFORE CHANNEL REMOVAL | NUMBER OF INPUT CHANNELS OF OPTICAL AMPLIFIER AFTER CHANNEL REMOVAL | INPUT LIGHT POWER OF OPTICAL AMPLIFIER AFTER CHANNEL REMOVAL [dBm] | | | |
|---|---|---|---|---|---|
| | | -20.0 TO -15.1 | -15.0 TO -10.1 | -10.0 TO -5.1 | -5.0 TO 0 |
| 40 | 39 | $G_1'$ | $G_2'$ | $G_3'$ | $G_4'$ |
| 40 | 38 | $G_5'$ | $G_6'$ | $G_7'$ | $G_8'$ |
| ⋮ | ⋮ | ⋮ | ⋮ | ⋮ | ⋮ |
| 2 | 1 | $G_{n-3}'$ | $G_{n-2}'$ | $G_{n-1}'$ | $G_n'$ |

OPTICAL TRANSMISSION SYSTEM, OPTICAL RECEPTION APPARATUS, AND SIGNAL ADJUSTMENT METHOD

CROSS-REFERENCE TO RELATED APPLICATION

This application is based upon and claims the benefit of priority of the prior Japanese Patent Application No. 2014-234026, filed on Nov. 18, 2014, the entire contents of which are incorporated herein by reference.

FIELD

The embodiments discussed herein are related to an optical transmission system, an optical reception apparatus, and a signal adjustment method.

BACKGROUND

In recent years, increase in transmission speed has been discussed for optical transmission systems that transmit wavelength division multiplexing (WDM) light. As the transmission speed is increased, however, the transmission characteristics are expected to deteriorate. A digital coherent receiving scheme is one of techniques useful for keeping the good transmission characteristics even if the transmission speed is increased. The digital coherent receiving scheme is a technique of high-speed digital signal processing for demodulating signal light separated from WDM light.

An optical reception apparatus that employs the digital coherent receiving scheme generates mixed light of local oscillation light and signal light separated from WDM light, coverts the generated mixed light into electric signals for demodulating the signal light, and amplifies each power of the electric signals within a predetermined tolerance level using an amplifier. Thereafter, the optical reception apparatus that employs the digital coherent receiving scheme demodulate the signal light by applying digital signal processing to the electric signals output from the amplifier.

This technique is disclosed in Japanese Laid-open Patent Publication No. 2013-38745, for example.

However, the above-mentioned conventional technique has a problem of the lowering of the demodulation accuracy of the signal light when the power of the signal light transitionally fluctuates due to change in the number of channels of the wavelength division multiplexing light.

Specifically, when the power of the signal light transitionally fluctuates due to the change in the number of channels of the wavelength division multiplexing light, each power of the electric signals input into the amplification section in the optical reception apparatus is not within the predetermined tolerance level. As a result, the characteristics of electric signals output from the amplifier deteriorate. For example, channel removal in the wavelength division multiplexing light causes the power of the signal light to transitionally rise, so that each power of the electric signals input into the amplification section exceeds the upper limit value in the tolerance level, and the amplifier outputs an electric signals with the deteriorated waveform.

In such a case, the conventional optical reception apparatus applies digital signal processing to the electric signals with the deteriorated waveform. For this reason, the demodulation accuracy of the signal light may be lowered.

Moreover, for example, channel addition to wavelength division multiplexing light causes the power of the signal light to transitionally drop, so that each power of the electric signals input into the amplification section is below the a lower limit value in the tolerance level, which results in the deteriorated signal noise ratio (SN) ratio of electric signals output from the amplifier. In such a case, the conventional optical reception apparatus applies digital signal processing to the electric signals having the deteriorated SN ratio, an, so that the demodulation accuracy of the signal light may be deteriorate.

In one aspect, an object is to provide an optical transmission system, an optical reception apparatus, a management apparatus, and a signal adjustment method which are capable of moderating the lowering of the demodulation accuracy of signal light even when the power of the signal light transitionally fluctuates due to the change in the number of channels of wavelength division multiplexing light.

SUMMARY

According to an aspect of the embodiments, an apparatus includes: a reception apparatus configured to receive signal light separated from wavelength division multiplexing light; and a management apparatus configured to manage a plurality of optical transmission apparatuses that transmit the wavelength division multiplexing light, wherein the reception apparatus further comprises: an amplification section configured to amplify each power of electric signals for demodulating the signal light within a predetermined tolerance level, the electric signals being converted from mixed light of local light and the signal light input into the reception apparatus, an adjustment section configured to adjust at least one of power of the signal light input into the reception apparatus and power of the local light, and a controller configured to control the adjustment section based on an adjustment amount notified by the management apparatus, the management apparatus includes a computer, and the computer is configured to perform: an estimation process to estimate, when a number of channels of the wavelength division multiplexing light is to be changed, an extreme value of the power of the signal light that fluctuates due to the change based on management information for each of the optical transmission apparatuses; a calculation process to calculate the adjustment amount, when the extreme value of the power of the signal light is not within a tolerance level of the power of the signal light in accordance with the tolerance level of the amplification section, based on the extreme value of the power of the signal light, and an upper limit value or a lower limit value in the tolerance level of the power of the signal light; and a notification process to notify the reception apparatus of the adjustment amount calculated by the calculation process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a view illustrating an example of an association table used by an estimation section;

FIG. 12 is a view illustrating another example of the association table used by the estimation section;

DESCRIPTION OF EMBODIMENTS

Embodiments discussed herein related to an optical transmission system, an optical reception apparatus, a management apparatus, and a signal adjustment method will be described in details in accordance with the drawings. Note that, the embodiments do not intend to limit a disclosed technology.

Figure 1:
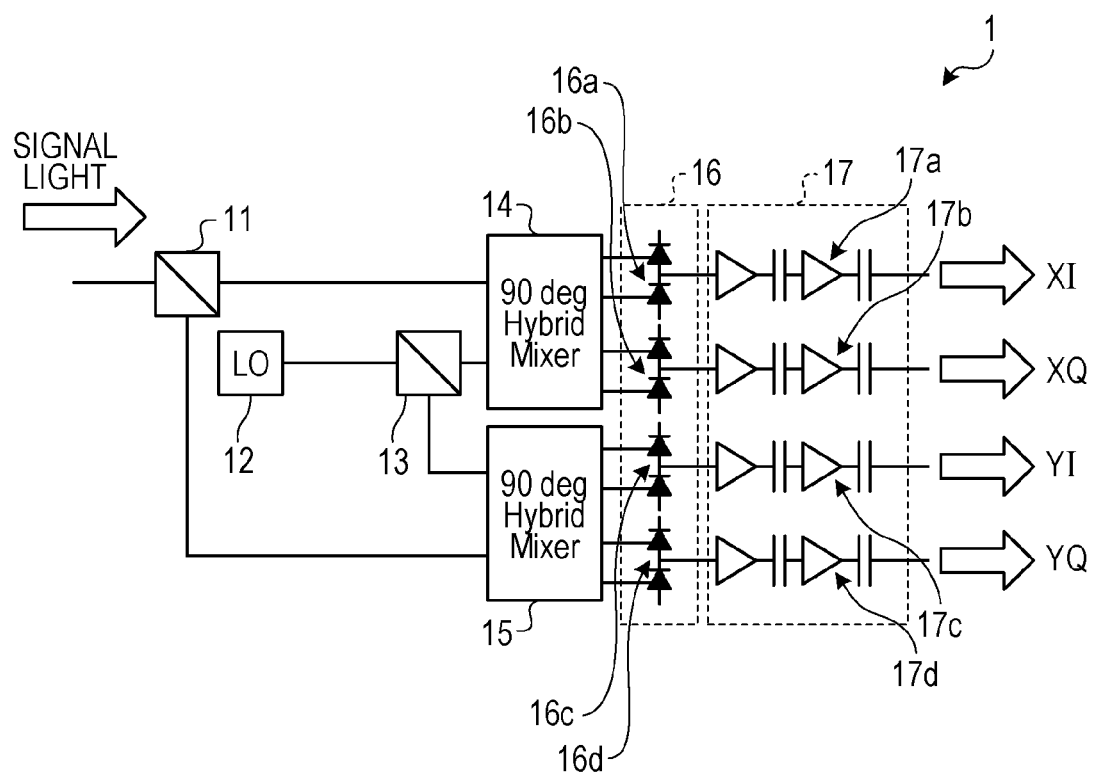
FIG. 1 is a diagram illustrating a configuration example of an optical receiver that employs a digital coherent receiving scheme.

Firstly, with reference to FIGS. 1 to 4, a technology serving as a precondition of an optical transmission system disclosed in the present application will be described. FIG. 1 is a diagram illustrating a configuration example of an optical receiver that employs a digital coherent receiving scheme. An optical receiver 1 illustrated in FIG. 1 is provided in an optical transmission system including multiple nodes that transmit wavelength division multiplexing (WDM) light, and receive signal light separated from the WDM light. Herein, the WDM light is WDM light obtained such that signal light of a dual polarization differential quadrature phase shift keying (DP-DQPSK) scheme is multiplexed.

The optical receiver 1 illustrated in FIG. 1 includes a polarizing beam splitter (PBS) 11, a local oscillator (LO) 12, a PBS 13, a 90 degree hybrid mixer 14, and a 90 degree hybrid mixer 15. Moreover, the optical receiver 1 includes a photo detector (PD) section 16, and an amplification section 17.

The PBS 11 separates signal light separated from the WDM light into two beams of the signal light. The polarization states of the two beams are orthogonal to each other. Hereinafter, one beam of the signal light out of the two beams of signal light the polarization states of which are orthogonal to each other is called X-polarized signal light, and the other beam of signal light is called Y-polarized signal light in some cases. The PBS 11 outputs the X-polarized signal light to the 90 degree hybrid mixer 14, and outputs the Y-polarized signal light to the 90 degree hybrid mixer 15.

The LO 12 generates local oscillation light (hereinafter, referred to as a "local light"), and outputs the generated local light to the PBS 13.

The PBS 13 separates local light input from the LO 12 into two beams of local light the polarization states of which are orthogonal to each other. Hereinafter, one beam of local light out of the two beams of local light the polarization states of which are orthogonal to each other is called X-polarized local light, and the other beam of local light is called Y-polarized local light in some cases. The PBS 13 outputs the X-polarized local light to the 90 degree hybrid mixer 14, and outputs the Y-polarized local light to the 90 degree hybrid mixer 15. The 90 degree hybrid mixer 14 generates mixed light of the X-polarized signal light input from the PBS 11 and the X-polarized local light input from the PBS 13, and outputs an in-phase (I) component and a quadrature (Q) component of the generated mixed light to the PD section 16.

The 90 degree hybrid mixer 15 generates mixed light of the Y-polarized signal light input from the PBS 11 and the Y-polarized local light input from the PBS 13, and outputs an I component and a Q component of the generated mixed light to the PD section 16.

The PD section 16 converts the mixed light input from the 90 degree hybrid mixer 14 and the mixed light input from the 90 degree hybrid mixer 15 into electric signals. The PD section 16 includes PDs 16a to 16d. The PD 16a converts the I component of the X-polarized mixed light (hereinafter, referred to as "XI component") input from the 90 degree hybrid mixer 14 into an electric signal, and outputs the electric signal of the XI component to the amplification section 17. The PD 16b converts the Q component of the X-polarized mixed light (hereinafter, referred to as "XQ component") input from the 90 degree hybrid mixer 14 into an electric signal, and outputs the electric signal of the XQ component to the amplification section 17. The PD 16c converts the I component of the Y-polarized mixed light (hereinafter, referred to as "YI component") input from the 90 degree hybrid mixer 15 into an electric signal, and outputs the electric signal of the YI component to the amplification section 17. The PD 16d converts the Q component of the Y-polarized mixed light (hereinafter, referred to as "YQ component") input from the 90 degree hybrid mixer 15 into an electric signal, and outputs the electric signal of the YQ component to the amplification section 17.

The amplification section 17 amplifies each power of the electric signals input from the PD section 16 within a predetermined tolerance level. The amplification section 17 includes amplifiers 17a to 17d. The amplifier 17a amplifies the power of the electric signal of the XI component input from the PD 16a, and outputs the amplified electric signal of the XI component to an analog digital converter/digital signal processor (ADC/DSP), which is not illustrated. The amplifier 17b amplifies the power of the electric signal of the XQ component input from the PD 16b, and outputs the amplified electric signal of the XQ component to the ADC/DSP. The amplifier 17c amplifies the power of the electric signal of the YI component input from the PD 16c, and outputs the amplified electric signal of the YI component to the ADC/DSP. The amplifier 17d amplifies the power of the electric signal of the YQ component input from the PD 16d, and outputs the amplified electric signal of the YQ component to the ADC/DSP.

Figure 2:
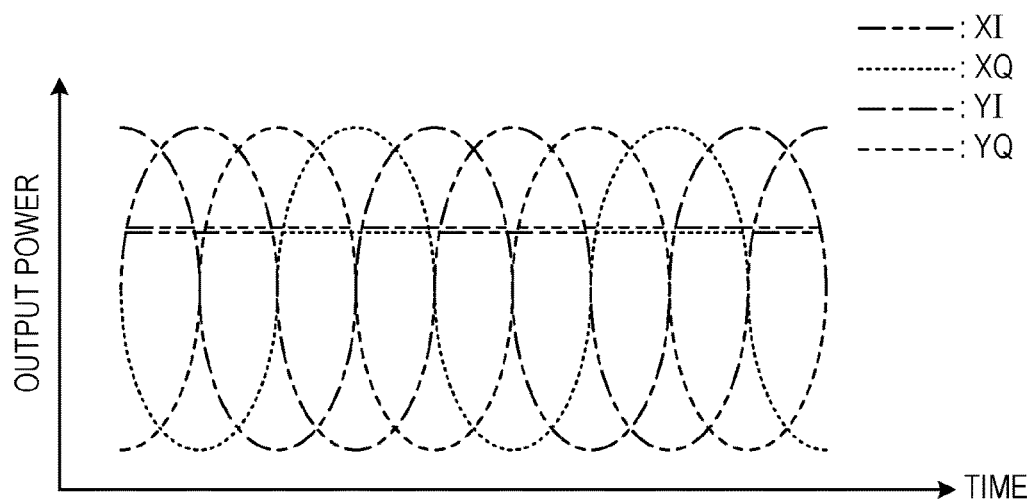
FIG. 2 is a graph illustrating an example of waveforms of electric signals output from an amplification section illustrated in FIG. 1.

The ADC/DSP applies predetermined digital signal processing to the electric signals output from the amplification section 17 to demodulate the signal light. FIG. 2 is a graph illustrating an example of a waveform of four electric signals output from the amplification section illustrated in FIG. 1. In FIG. 2, the horizontal axis represents the time, and the longitudinal axis represents each power of the electric signals output from the amplification section 17. Note that, in the example illustrated in FIG. 2, it is assumed that the power of electric signals input into the amplification section 17 (in other words, electric signals of the XI component, the XQ component, the YI component, and the YQ component) exceeds an upper limit value in the predetermined tolerance level.

As illustrated in FIG. 2, the waveform of the electric signals output from the amplification section 17 (in other words, electric signals of the XI component, the XQ component, the YI component, and the YQ component) are clipped because each power of the electric signal input into the amplification section 17 exceeds the upper limit value in the predetermined tolerance level. For example, in FIG. 2, a dashed line portion on the waveform of the electric signals of the XI component, the XQ component, the YI component, and the YQ component is clipped. Further, an ideal waveform of the electric signals of the XI component, the XQ component, the YI component, and the YQ component originally includes the dashed line portion.

When each power of the electric signals input into the amplification section 17 exceeds the upper limit value in the predetermined tolerance level, the ADC/DSP applies predetermined digital signal processing to the electric signals with the clipped dashed line portion illustrated in FIG. 2. In this case, the clipped dashed line portion illustrated in FIG. 2 might lower the demodulation accuracy of the signal light by the ADC/DSP.

Figure 3:
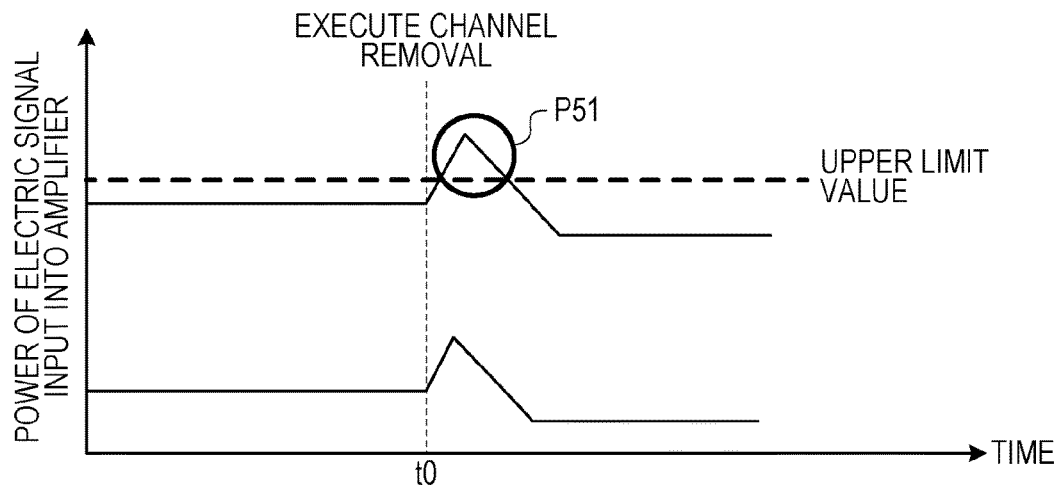
FIG. 3 is a graph illustrating an example of transition of the power of an electric signal input into the amplification section illustrated in FIG. 1.

FIG. 3 is a graph illustrating an example of transition of the power of an electric signal input into the amplification section illustrated in FIG. 1. In FIG. 3, the horizontal axis represents the time, and the longitudinal axis represents the power of an electric signal input into the amplification section 17.

Here, the power of the electric signal input into the amplification section 17 corresponds to the power of the electric signals of the XI component, the XQ component, the YI component, and the YQ component. Transitional increase in the power of the signal light input into the optical receiver 1 due to channel removal of the WDM light also causes the power of the electric signal input into the amplification section 17 to transitionally increase, as illustrated in FIG. 3. For example, in FIG. 3, it is assumed that channel removal of the WDM light is performed at a time t0. In this case, if an attention is focused on a portion P51 surrounded by the heavy line, a local maximum value of the power of the electric signal input into the amplification section 17 exceeds the upper limit value in the predetermined tolerance level.

This is the same meaning as a local maximum value of the power of the signal light input into the optical receiver 1 exceeding an upper limit value in the tolerance level of the power of the signal light determined in accordance with the tolerance level of the amplification section 17. The local maximum value of the power of the electric signal input into the amplification section 17 exceeding the upper limit value in the predetermined tolerance level results in the deteriorated waveform of an electric signal output from the amplification section 17 (in other words, electric signals of the XI component, the XQ component, the YI component, and the YQ component), as is explained in FIG. 2. This might lower the demodulation accuracy of the signal light by the ADC/DSP.

Figure 4:
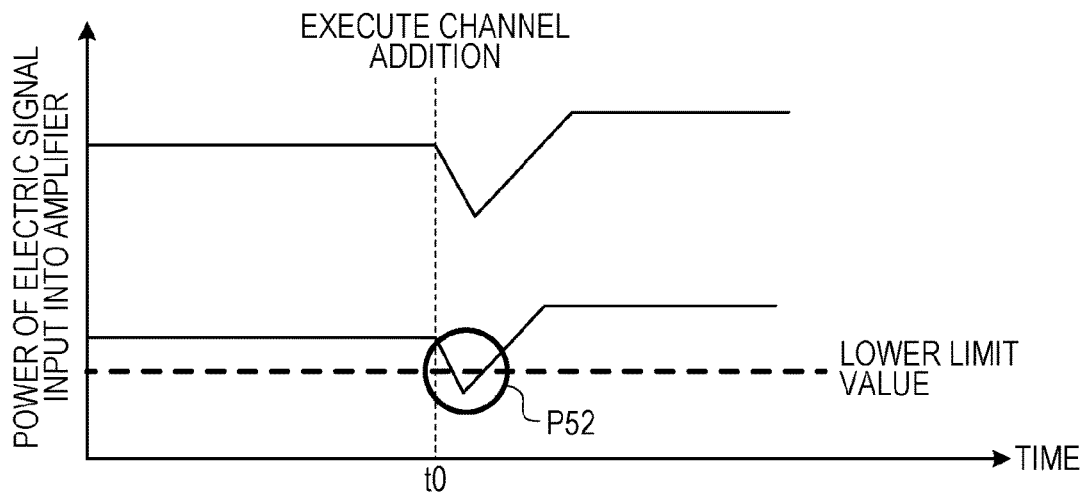
FIG. 4 is a graph illustrating another example of transition of the power of an electric signal input into the amplification section illustrated in FIG. 1.

Such lowering of the demodulation accuracy of the signal light may also be grasped from an example illustrated in FIG. 4. FIG. 4 is a graph illustrating another example of transition of the power of an electric signal input into the amplification section illustrated in FIG. 1. In FIG. 4, the horizontal axis represents the time, and the longitudinal axis represents the power of an electric signal input into the amplification section 17. Here, the power of the electric signal input into the amplification section 17 corresponds to each power of the electric signals of the XI component, the XQ component, the YI component, and the YQ component.

Transitional decrease in the power of the signal light input into optical receiver 1 due to channel addition of the WDM light also causes the power of the electric signal input into the amplification section 17 to transitionally decrease, as illustrated in FIG. 4. For example, in FIG. 4, it is assumed that the channel addition of the WDM light is performed at a time t0. In this case, if an attention is focused on a portion P52 surrounded by the heavy line, a local minimum value of the power of the electric signal input into the amplification section 17 is below a lower limit value in the predetermined tolerance level. This is the same meaning as a local minimum value of the power of the signal light input into the optical receiver 1 below a lower limit value in the tolerance level of the power of the signal light determined in accordance with the tolerance level of the amplification section 17. The local minimum value of the power of the electric signal input into the amplification section 17 below the lower limit value in the predetermined tolerance level results in the deteriorated signal noise ratio (SN ratio) of the electric signal output from the amplification section 17 (in other words, electric signals of the XI component, the XQ component, the YI component, and the YQ component). Note that, it is known that the deteriorated SN ratio of the electric signal output from the amplification section 17 also lower the demodulation accuracy of the signal light by the ADC/DSP.

EMBODIMENTS

Firstly, a signal adjustment method by an optical transmission system according to an embodiment will be described. The optical transmission system in the embodiment includes multiple nodes that transmit WDM light, an optical receiver that receives signal light separated from the WDM light, and a management apparatus that manages the multiple nodes. The management apparatus estimates an extreme value of the power of the signal light based on management information for each node when the number of channels of the WDM light is to be changed. When the extreme value of the power of the signal light is not within a tolerance level of the power of the signal light in accordance with a tolerance level of an amplification section in the optical receiver, the management apparatus calculates an adjustment amount to be used in an adjustment section in the optical receiver, based on the extreme value of the power of the signal light, and an upper limit value or a lower limit value in the tolerance level of the power of the signal light. The management apparatus notifies the optical receiver of the calculated adjustment amount. Further, the optical receiver amplifies the power of electric signals for demodulating signal light using the amplification section, the electric signals being converted from mixed light of the signal light to be input and local light, and adjusts the power of the signal light input or power of the local light, based on the adjustment amount notified by the management apparatus.

Figure 5:
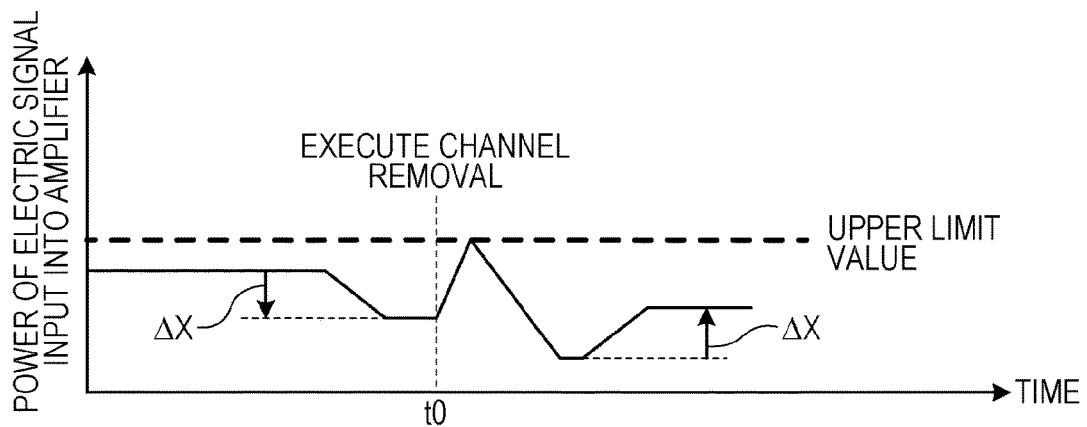
FIG. 5 is a graph for explaining an example of a signal adjustment method by an optical transmission system according to an embodiment.

FIG. 5 is a graph for explaining an example of a signal adjustment method by the optical transmission system in the embodiment. In FIG. 5, the horizontal axis represents the time, and the longitudinal axis represents the power of an electric signal input into the amplification section in the optical receiver. Here, each power of the electric signals input into the amplification section in the optical receiver corresponds to each power of the electric signals of the XI component, the XQ component, the YI component, and the YQ component, which is already explained in FIG. 1 to FIG. 4. Moreover, in the example illustrated in FIG. 5, a case where channel removal of the WDM light is performed at a time t0, and the power of the signal light transitionally rises due to the channel removal of the WDM light will be described.

The management apparatus estimates a local maximum value of the power of the signal light that fluctuates due to the channel removal of the WDM light, based on management information for each node. Here, assumed is a case where the estimated local maximum value of the power of the signal light exceeds an upper limit value in the tolerance level of the power of the signal light in accordance with the tolerance level of the amplification section in the optical receiver. In this case, a local maximum value of the power of an electric signal input into the amplification section in the optical receiver exceeding the upper limit value in the predetermined tolerance level is predicted. Accordingly, the management apparatus calculates a difference $\Delta X$ between the local maximum value of the power of the signal light and the upper limit value in the tolerance level of the power of the signal light, as an adjustment amount in the adjustment section in the optical receiver, and notifies the optical receiver of the calculated adjustment amount $\Delta X$. Further, the optical receiver performs an adjustment to lower the power of the signal light to be input or the local light, based on the adjustment amount $\Delta X$ from the management apparatus. The power of the electric signal input into the amplification section in the optical receiver accordingly decreases only by the adjustment amount $\Delta X$ before the channel removal of the WDM light is performed, as illustrated in FIG. 5.

This allows the local maximum value of the power of the electric signal input into the amplification section in the optical receiver to fall within the predetermined tolerance level even when the channel removal of the WDM light is performed. As a result, the deterioration of the waveform of electric signals (in other words, electric signals of the XI component, the XQ component, the YI component, and the YQ component) output from the amplification section in the optical receiver is reduced, the lowering of the demodulation accuracy of the signal light is moderated. Further, the management apparatus notifies the optical receiver of an invalidation instruction to invalidate the adjustment amount $\Delta X$ in a case where after the channel removal of the WDM light is performed, a convergence value of the power of the signal light that fluctuates due to the channel removal falls within the tolerance level of the power of the signal light.

Further, the optical receiver performs control to invalidate the adjustment amount $\Delta X$ based on the invalidation instruction. This increases the power of the electric signal input into the amplification section in the optical receiver only by the adjustment amount $\Delta X$, as illustrated in FIG. 5.

Figure 6:
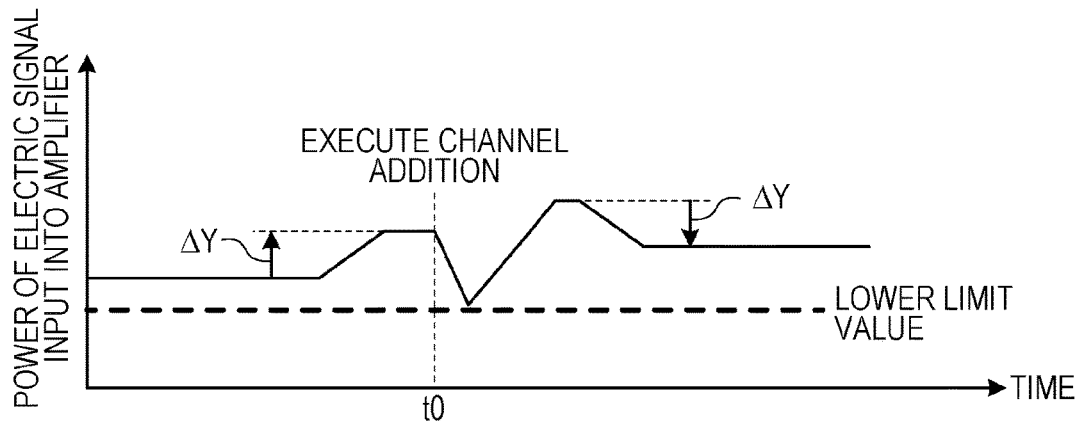
FIG. 6 is a graph for explaining another example of the signal adjustment method by the optical transmission system in the embodiment.

FIG. 6 is a graph for explaining another example of the signal adjustment method by the optical transmission system in the embodiment. In FIG. 6, the horizontal axis represents the time, and the longitudinal axis represents the power of an electric signal input into the amplification section in the optical receiver. Here, the power of the electric signal input into the amplification section in the optical receiver corresponds to each power of the electric signals of the XI component, the XQ component, the YI component, and the YQ component, which is already explained in FIGS. 1 to 4. Moreover, in the example illustrated in FIG. 6, a case where channel addition of the WDM light is performed at a time t0, and the power of the signal light transitionally drops due to the channel addition of the WDM light will be described.

The management apparatus estimates a local minimum value of the power of the signal light that fluctuates due to the channel addition of the WDM light, based on management information for each node. Here, assumed is a case where the estimated local minimum value of the power of the signal light is below a lower limit value in the tolerance level of the power of the signal light in accordance with the tolerance level of the amplification section in the optical receiver. In this case, a local minimum value of the power of an electric signal input into the amplification section in the optical receiver below the lower limit value in the predetermined tolerance level is predicted. Accordingly, the management apparatus calculates a difference $\Delta Y$ between the local minimum value of the power of the signal light and the lower limit value in the tolerance level of the power of the signal light, as an adjustment amount in the adjustment section in the optical receiver, and notifies the optical receiver of the calculated adjustment amount $\Delta Y$. Further, the optical receiver performs an adjustment to increase the power of the signal light to be input or the local light, based on the adjustment amount $\Delta Y$ from the management apparatus.

The power of the electric signal input into the amplification section in the optical receiver accordingly increases only by the adjustment amount $\Delta Y$ before the channel addition of the WDM light is performed, as illustrated in FIG. 6. This allows the local minimum value of the power of the electric signal input into the amplification section in the optical receiver to fall within the predetermined tolerance level even when the channel addition of the WDM light is performed. As a result, the deterioration of the SN ratio of electric signals (in other words, electric signals of the XI component, the XQ component, the YI component, and the YQ component) output from the amplification section in the optical receiver is reduced, and the lowering of the demodulation accuracy of the signal light is moderated. Further, the management apparatus notifies the optical receiver of an invalidation instruction to invalidate the adjustment amount $\Delta Y$ in a case where after the channel addition of the WDM light is performed, a convergence value of the power of the signal light that fluctuates due to the channel addition falls within the tolerance level of the power of the signal light. Further, the optical receiver performs control to invalidate the adjustment amount $\Delta Y$ based on the invalidation instruction. This decreases the power of the electric signal input into the amplification section in the optical receiver only by the adjustment amount $\Delta Y$, as illustrated in FIG. 6.

Next, a configuration example of the optical transmission system in the embodiment will be described.

Figure 7:
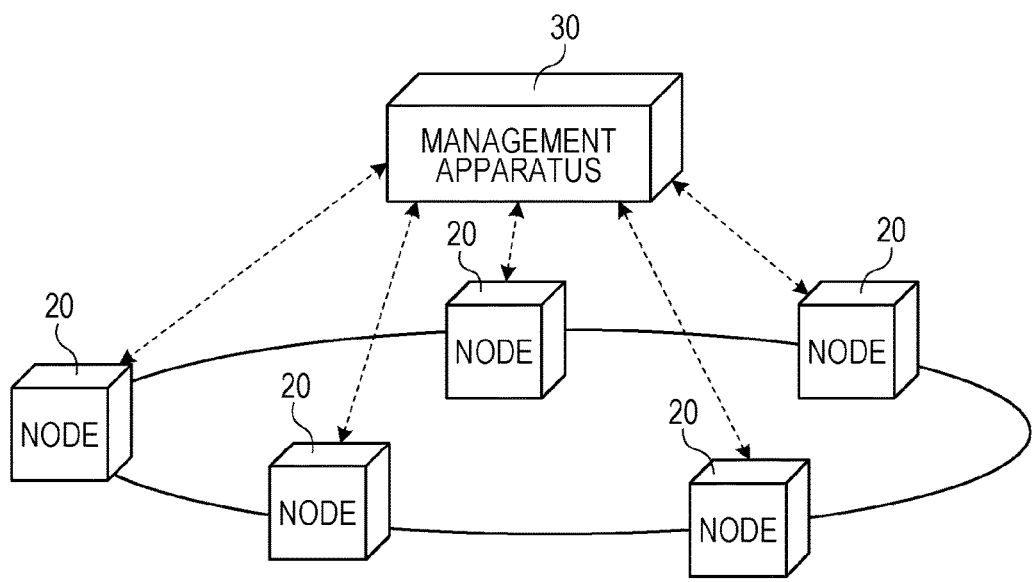
FIG. 7 is a diagram illustrating a configuration example of the optical transmission system in the embodiment.

FIG. 7 is a diagram illustrating a configuration example of the optical transmission system in the embodiment. The optical transmission system illustrated in FIG. 7 includes multiple nodes 20 that are connected to one another by an optical transmission path such as an optical fiber, and a management apparatus 30 that manages the multiple nodes 20. The node 20 transmits WDM light via the optical transmission path. The node 20 is an example of an optical transmission apparatus. Note that, in the following explanation, the WDM light is WDM light obtained such that signal light of a DP-DQPSK scheme is multiplexed.

Figure 8:
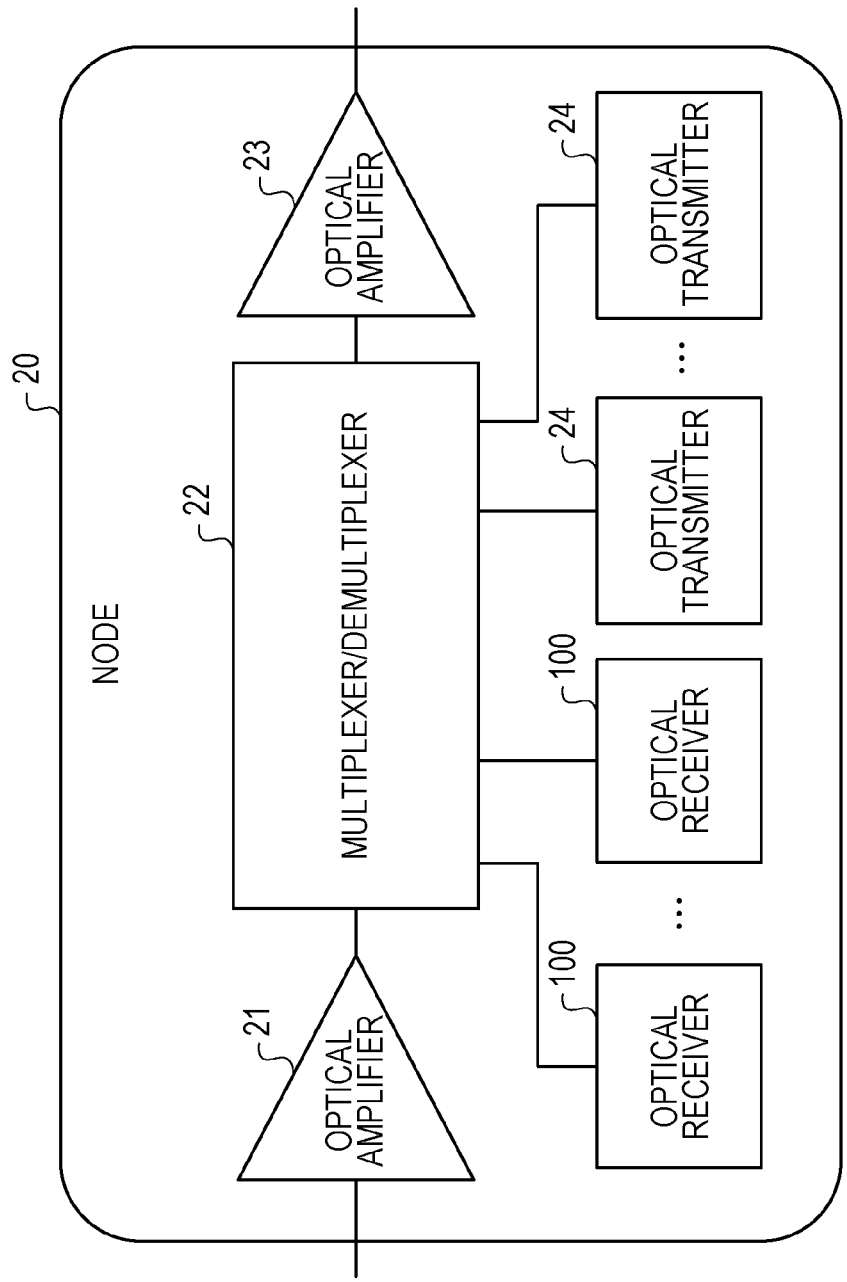
FIG. 8 is a diagram illustrating a configuration example of a node in the optical transmission system in the embodiment.

FIG. 8 is a diagram illustrating a configuration example of the node in the optical transmission system in the embodiment. The node 20 illustrated in FIG. 8 includes an optical amplifier 21, a multiplexer/demultiplexer 22, an optical amplifier 23, multiple optical transmitters 24, and multiple optical receivers 100.

The optical amplifier 21 amplifies WDM light received from the optical transmission path. The multiplexer/demultiplexer 22 separates signal light from the received WDM light, and outputs the signal light separated from the WDM light to the optical receiver 100. Moreover, the multiplexer/demultiplexer 22 inserts signal light output from the optical transmitter 24 into WDM light, and outputs the WDM light into which the signal light is inserted to the optical amplifier 23. The optical amplifier 23 amplifies the WDM light output from the multiplexer/demultiplexer 22, and outputs the amplified WDM light to the optical transmission path. The optical transmitter 24 generates signal light, and outputs the generated signal light to the multiplexer/demultiplexer 22. The optical receiver 100 is an optical receiver that employs the digital coherent receiving scheme. The optical receiver 100 receives signal light separated from the WDM light by the multiplexer/demultiplexer 22. The optical receiver 100 is an example of an optical reception apparatus.

Figure 9:
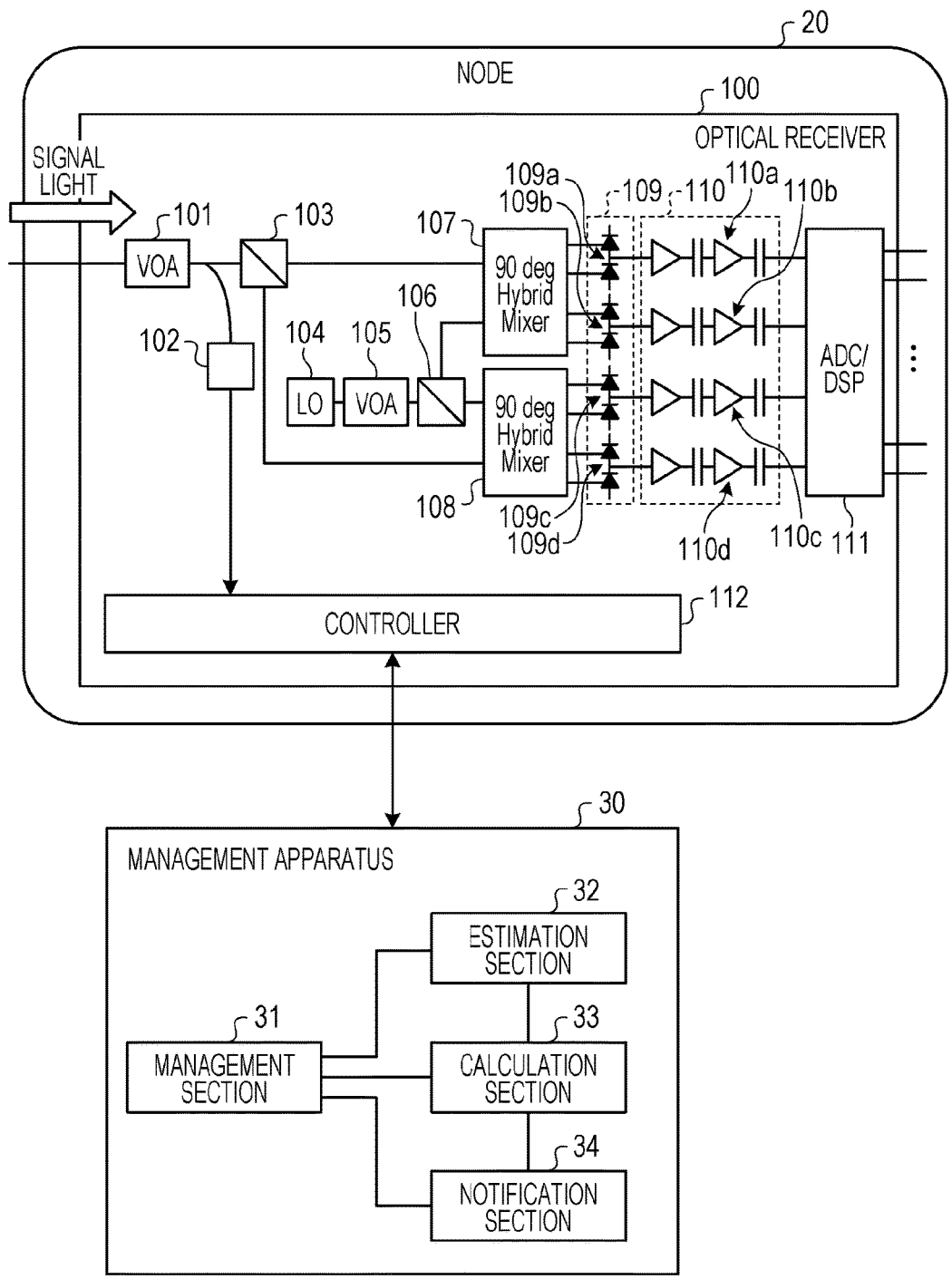
FIG. 9 is a diagram illustrating a configuration example of an optical receiver in the optical transmission system in the embodiment.

FIG. 9 is a diagram illustrating a configuration example of an optical receiver in the optical transmission system in the embodiment. Note that, although FIG. 9 illustrates a configuration example of an arbitrary optical receiver out of the multiple optical receivers 100 illustrated in FIG. 8, optical receivers other than the arbitrary optical receiver have the similar configuration, and therefor explanations thereof are omitted herein. The optical receiver 100 illustrated in FIG. 9 includes a variable optical attenuator (VOA) 101, a PD 102, a PBS 103, an LO 104, and a VOA 105.

Moreover, the optical receiver 100 includes a PBS 106, a 90 degree hybrid mixer 107, a 90 degree hybrid mixer 108, a PD section 109, an amplification section 110, an ADC/DSP 111, and a controller 112. The VOA 101 adjusts the power of signal light separated from WDM light and input into the optical receiver 100 (Hereinafter, referred to as "input signal light"). The controller 112 controls an adjustment amount of the power by the VOA 101. The VOA 101 is an example of an adjustment section.

The PD 102 detects the power of input signal light, and outputs the detected power of the input signal light to the controller 112. The PBS 103 separates the input signal light into two beams of signal light the polarization states of which are orthogonal to each other. Hereinafter, one beam of signal light out of the two beams of signal light the polarization states of which are orthogonal to each other is called X-polarized signal light, and the other beam of signal light is called Y-polarized signal light in some cases. The PBS 103 outputs X-polarized signal light to the 90 degree hybrid mixer 107, and outputs Y-polarized signal light to the 90 degree hybrid mixer 108. The LO 104 generates local light, and outputs the generated local light to the VOA 105. The VOA 105 adjusts the power of the local light output from the LO 104. The controller 112 controls an adjustment amount of the power by the VOA 105. The VOA 105 is an example of an adjustment section. The PBS 106 separates the local light into two beams of local light the polarization states of which are orthogonal to each other. Hereinafter, one beam of local light out of the two beams of local light the polarization states of which are orthogonal to each other is called X-polarized local light, and the other beam of local light is called Y-polarized local light in some cases. The PBS 106 outputs X-polarized local light to the 90 degree hybrid mixer 107, and outputs Y-polarized local light to the 90 degree hybrid mixer 108.

The 90 degree hybrid mixer 107 generates mixed light of the X-polarized signal light input from the PBS 103 and the X-polarized local light input from the PBS 106, and outputs an I (In-phase) component and a Q (Quadrature) component of the generated mixed light to the PD section 109. The 90 degree hybrid mixer 108 generates mixed light of the Y-polarized signal light input from the PBS 103 and the Y-polarized local light input from the PBS 106, and outputs an I component and a Q component of the generated mixed light to the PD section 109. The PD section 109 converts the mixed light input from the 90 degree hybrid mixer 107 and the mixed light input from the 90 degree hybrid mixer 108 into electric signals.

The PD section 109 includes PDs 109a to 109d. The PD 109a converts the I component of the X-polarized mixed light (hereinafter, referred to as "XI component") input from the 90 degree hybrid mixer 107 into an electric signal, and outputs the electric signal of the XI component to the amplification section 110. The PD 109b converts the Q component of the X-polarized mixed light (hereinafter, referred to as "XQ component") input from the 90 degree hybrid mixer 107 into an electric signal, and outputs the electric signal of the XQ component to the amplification section 110. The PD 109c converts the I component of the Y-polarized mixed light (hereinafter, referred to as "YI component") input from the 90 degree hybrid mixer 108 into an electric signal, and outputs the electric signal of the YI component to the amplification section 110. The PD 109d converts the Q component of the Y-polarized mixed light (hereinafter, referred to as "YQ component") input from the 90 degree hybrid mixer 108 into an electric signal, and outputs the electric signal of the YQ component to the amplification section 110.

The amplification section 110 amplifies the power of electric signals input from the PD section 109 within a predetermined tolerance level. The amplification section 110 includes amplifiers 110a to 110d. The amplifier 110a amplifies the power of the electric signal of the XI component input from the PD 109a, and outputs the amplified electric signal of the XI component to the ADC/DSP 111. The amplifier 110b amplifies the power of the electric signal of the XQ component input from the PD 109b, and outputs the amplified electric signal of the XQ component to the ADC/DSP 111. The amplifier 110c amplifies the power of the electric signal of the YI component input from the PD 109c, and outputs the amplified electric signal of the YI component to the ADC/DSP 111.

The amplifier 110d amplifies the power of the electric signal of the YQ component input from the PD 109d, and outputs the amplified electric signal of the YQ component to the ADC/DSP 111. The ADC/DSP 111 applies predetermined digital signal processing to the electric signals output from the amplification section 110 to demodulate the signal light.

The controller 112 controls the adjustment amount of the power by the VOA 101 and/or the adjustment amount of the power by the VOA 105, based on an adjustment amount notified by the management apparatus 30. Here, the adjustment amount notified by the management apparatus 30 includes an attenuation amount or the like that attenuates the power of respective channels in the input signal light. Moreover, the controller 112 transmits the power of the input signal light detected by the PD 102 to the management apparatus 30.

Moreover, the management apparatus 30 is configured to include, for example, a general-purpose personal computer, a piece station, and the like, and is connected to all the nodes 20 and the optical receivers 100 in the optical transmission system through a local area network (LAN) or the like.

The management apparatus 30 includes a management section 31, an estimation section 32, a calculation section 33, and a notification section 34, which are configured of a computer execution program. The management section 31 manages management information for each node 20. The management information includes path information on the entire network to which the nodes 20 are connected, and apparatus information on the node 20.

The path information is information indicating by which of the nodes 20 each channel is inserted into or separated from the WDM light. The apparatus information includes, for each of types of the nodes 20, a gain of the optical amplifier 21 or the like that is mounted in the node 20 and amplifies WDM light, and average power of channels inserted by the node 20 out of the channels of the WDM light.

Moreover, the apparatus information includes, for each of the types of the nodes 20, the number of channels of the WDM light that are inserted by a different node 20 upstream of the node 20, and are separated as signal light by the node 20, and a loss of an optical transmission path that connects the node 20 to an adjacent node 20.

When change in the number of channels of WDM light is performed, the estimation section 32 estimates an extreme value of the power of input signal light that fluctuates due to the change in the number of channels, based on management information for each node 20. The extreme value of the power of the input signal light includes a local maximum value of the power of the input signal light that transitionally rises due to the channel removal of the WDM light, and a local minimum value of the power of the input signal light that transitionally drops due to the channel addition of the WDM light. Here, an example of a method of estimating an extreme value of the power of input signal light that fluctuates due to the change in the number of channels will be described.

Figure 10:
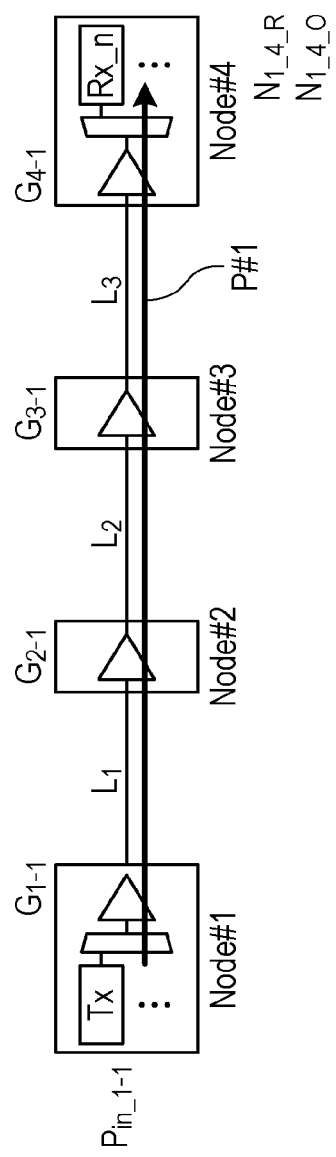
FIG. 10 is a diagram illustrating an example of a method of estimating an extreme value of the power of input signal light that fluctuates due to the change in the number of channels (No. 1)

FIG. 10 is a diagram illustrating an example of a method of estimating an extreme value of the power of input signal light that fluctuates due to the change in the number of channels (No. 1). In an optical transmission system illustrated in FIG. 10, it is assumed that a node #1 (Node#1) to a node #4 (Node#4) are connected by a Point-to-Point method. Moreover, in the optical transmission system illustrated in FIG. 10, a path P#1 from the node #1 to the node #4 is established. Hereinafter, a method in which when the power of input signal light input into an optical receiver Rx_n in the node #4 transitionally rises due to the channel removal, the estimation section 32 estimates a local maximum value of the power of the input signal light input into the optical receiver Rx_n in the node #4 will be described.

Moreover, in FIG. 10, $P_{in\_m\text{-}n}$ (m and n are integers of 1 or more) indicates average power of signal light input into an n-th stage optical amplifier that is mounted to a node #m, in other words, average power of channels that are inserted at the node #m, out of channels of the WDM light. $G_{m\text{-}n}$ is a gain of the n-th stage optical amplifier that is mounted to the node #m and amplifies WDM light. $L_j$ is a loss of a j a is an integer of 1 or more)-th optical transmission path that connects the node to an adjacent node. $N_{m\_k\_R}$ (k is an integer of 1 or more) is the number of channels, out of channels of the WDM light, that are inserted at the node #m and are separated at an node #k, as input signal light to an optical receiver Rx_n. $N_{m\_k\_O}$ is the number of channels, out of channels of the WDM light, that are inserted at the node #m and are separated at the node #k, as input signal light to optical receivers other than the optical receiver Rx_n. Here, the management section 31 manages the average power $P_{in\_m\text{-}n}$ of the channel, the gain $G_{m\text{-}n}$ of the optical amplifier, the loss $L_j$ of the optical transmission path, the number of channels $N_{m\_k\_R}$, and the like, as apparatus information included in management information.

The estimation section 32 reads management information such as path information and apparatus information from the management section 31 when receiving a previous notice of channel removal noticing that channel removal will be performed in the WDM light transmitted through the path P#1 illustrated in FIG. 10. The estimation section 32 specifies the path P#1 corresponding to a channel to be removed, based on the path information and information on the channel to be removed, which are included in the management information. The estimation section 32 uses the path information included in the management information to acquire the number of channels of signal light input into optical amplifiers (optical amplifiers mounted to the nodes #1 to #4) on the path P#1 before the channel removal is performed (hereinafter, referred to as "the number of input channels of the optical amplifier before the channel removal"). The estimation section 32 uses the path information included in the management information to acquire the number of channels of signal light input into optical amplifiers (optical amplifiers mounted to the nodes #1 to #4) on the path P#1 after the channel removal is performed (hereinafter, referred to as "the number of input channels of the optical amplifier after the channel removal"). The estimation section 32 uses, for example, an association table illustrated in FIG. 11 to acquire a gain variation amount of the optical amplifier after the channel removal that is associated with the number of input channels of the optical amplifier before the channel removal and the number of input channels of the optical amplifier after the channel removal.

FIG. 11 is a view illustrating an example of an association table used by the estimation section. As illustrated in FIG. 11, the association table is a table in which the number of input channels of the optical amplifier before the channel removal, the number of input channels of the optical amplifier after the channel removal, and a gain variation amount of the optical amplifier after the channel removal are associated with one another. Subsequently, the estimation section 32 adds the gain variation amount acquired from the association table to the gain $G_{m\text{-}n}$ of the optical amplifier to calculate a gain $G_{m\text{-}n}'$ of the optical amplifier after the channel removal. The estimation section 32 estimates, based on the gain $G_{m\text{-}n}'$ of the optical amplifier after the channel removal and the apparatus information included in the management information, a local maximum value $P_{in\_total}'$ of the power of input signal light input into the optical receiver Rx_n.

For example, when the number of channels $N_{1\_4\_O}$ changes due to the channel removal, the estimation section 32 uses (Expression 1) to estimate a local maximum value $P_{in\_total}'$ of the power of input signal light input into the optical receiver Rx_n.

$$P_{in\_total}' = N_{1\_4\_R} \times P_{in\_1-1} \times G_{1-1}' \times L_1 \times G_{2-1}' \times L_2 \times G_{3-1}' \times L_3 \times G_{4-4}'$$ (Expression 1)

Moreover, for example, when the number of channels $N_{1\_4\_R}$ changes to $N_{1\_4\_R}'$ due to the channel removal, the estimation section 32 uses (Expression 2) to estimate a local maximum value $P_{in\_total}'$ of the power of input signal light input into the optical receiver Rx_n.

$$P_{in\_total}' = N_{1\_4\_R}' \times P_{in\_1-1} \times G_{1-1}' \times L_1 \times G_{2-1}' \therefore L_2 \times G_{3-4}' \times L_3 \times G_{4-1}'$$ (Expression 2)

Note that, the data structure of the association table is not limited to that illustrated in FIG. 11.

For example, an association table illustrated in FIG. 12 may be used as an association table.

FIG. 12 is a view illustrating another example of an association table used by the estimation section. The association table illustrated in FIG. 12 is a table in which the number of input channels of the optical amplifier before the channel removal, the number of input channels of the optical amplifier after the channel removal, and a gain of the optical amplifier after the channel removal in accordance with the power of the signal light input into the optical amplifier before the channel removal are associated with one another.

Figure 13:
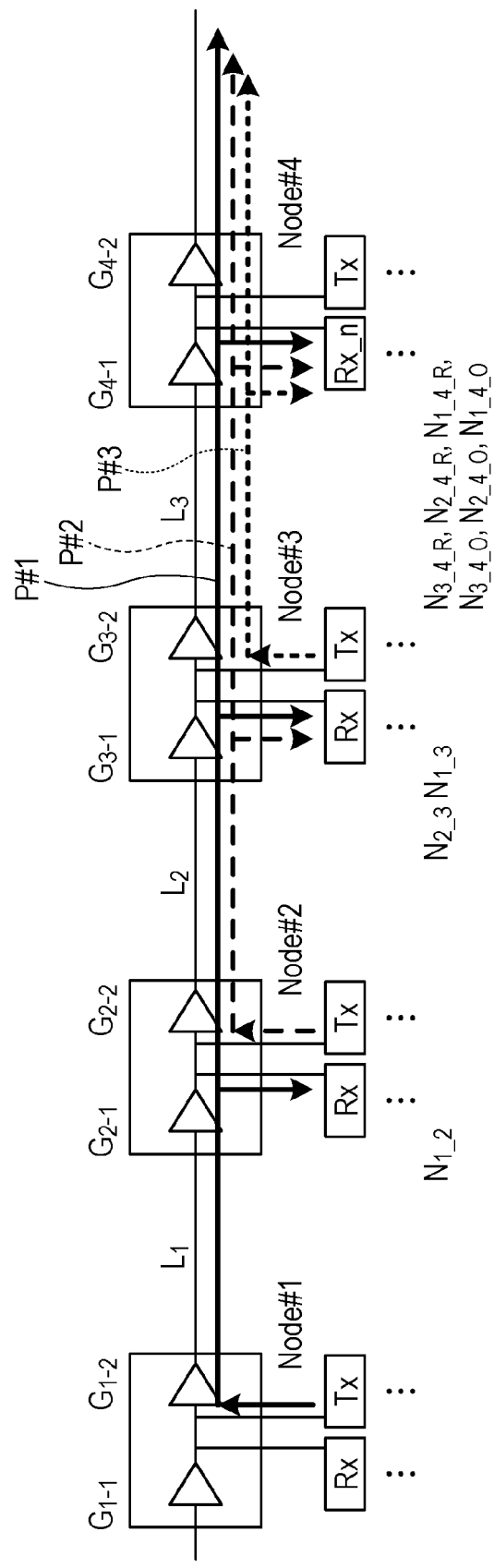
FIG. 13 is a diagram illustrating an example of a method of estimating an extreme value of the power of input signal light that fluctuates due to the change in the number of channels (No. 2)

FIG. 13 is a diagram illustrating an example of a method of estimating an extreme value of the power of input signal light that fluctuates due to the change in the number of channels (No. 2). In an optical transmission system illustrated in FIG. 13, a node #1 (Node#1) to a node #4 (Node#4) are nodes having an optical add/drop multiplexing (OADM) function.

Moreover, in the optical transmission system illustrated in FIG. 13, a path P#1 from the node #1 to the node #4, a path P#2 from the node #2 to the node #4, and a path P#3 from the node #3 to the node #4 are established. Hereinafter, a method in which when the power of input signal light input into an optical receiver Rx_n in the node #4 transitionally rises due to the channel removal, the estimation section 32 estimates a local maximum value of the power of the input signal light input into the optical receiver Rx_n in the node #4 will be described.

Moreover, in FIG. 13, $P_{in\_m-n}$ (m, n are integers of 1 or more) indicates average power of signal light input into an n-th stage optical amplifier that is mounted to a node #m, in other words, average power of channels that are inserted at the node #m, out of channels of the WDM light. $G_{m-n}$ is a gain of the n-th stage optical amplifier that is mounted to the node #m and amplifies WDM light.

$L_j$ is a loss of a j (j is an integer of 1 or more)-th optical transmission path that connects the node to an adjacent node.

$N_{m\_k\_R}$ (k is an integer of 1 or more) is the number of channels, out of channels of the WDM light, that are inserted at the node #m and are separated at an node #k, as input signal light to an optical receiver Rx_n.

$N_{m\_k\_O}$ is the number of channels, out of channels of the WDM light, that are inserted at the node #m and are separated at the node #k, as input signal light to optical receivers other than the optical receiver Rx_n.

$N_{m\_k}$ is the number of channels, out of channels of the WDM light, that are inserted at the node #m and are separated at the node #k.

Here, the average power $P_{in\_m-n}$ of the channels, the gain $G_{m-n}$ of the optical amplifier, the loss $L_j$ of the optical transmission path, the number of channels $N_{m\_k\_R}$, the number of channels $N_{m\_k}$, and the like are managed by the management section 31 as apparatus information included in management information. The estimation section 32 performs the following process when receiving a previous notice of channel removal noticing that channel removal will be performed in the WDM light transmitted through the path P#1 illustrated in FIG. 13. In other words, the estimation section 32 reads management information such as path information and apparatus information from the management section 31, and specifies the path P#1 corresponding to a channel to be removed, based on the path information and information on a channel to be removed, which are included in the management information.

The estimation section 32 uses the path information included in the management information to acquire the number of channels of signal light input into optical amplifiers (optical amplifiers mounted to the nodes #1 to #4) on the path P#1 before the channel removal is performed (hereinafter, referred to as "the number of input channels of the optical amplifier before the channel removal").

The estimation section 32 uses the path information included in the management information to acquire the number of channels of signal light input into optical amplifiers (optical amplifiers mounted to the nodes #1 to #4) on the path P#1 after the channel removal is performed (hereinafter, referred to as "the number of input channels of the optical amplifier after the channel removal").

The estimation section 32 uses, for example, the an association table illustrated in FIG. 11 to acquire a gain variation amount of the optical amplifier after the channel removal that is associated with the number of input channels of the optical amplifier before the channel removal and the number of input channels of the optical amplifier after the channel removal.

Subsequently, the estimation section 32 adds the gain variation amount acquired from the association table to the gain $G_{m-n}$ of the optical amplifier to calculate a gain $G_{m-n}'$ of the optical amplifier after the channel removal.

Further, the estimation section 32 estimates, based on the gain $G_{m-n}'$ of the optical amplifier after the channel removal and the apparatus information included in the management information, a local maximum value $P_{in\_total}'$ of the power of input signal light input into the optical receiver Rx_n.

For example, when the number of channels $N_{1\_4\_R}$ does not change and the number of channels $N_{1\_2}$ changes due to the channel removal, the estimation section 32 uses (Expression 3) to estimate a local maximum value $P_{in\_total}'$ of the power of input signal light input into the optical receiver Rx_n.

$$P_{in\_total}' = [N_{1\_4\_R} \times P_{in\_1-2} \times G_{1-2}' \times L_1 \times G_{2-1}' \times G_{2-2} \times L_2 \times G_{3-1} + N_{2\_4\_R} \times P_{in\_2-2} \times G_{2-2} \times L_2 \times G_{3-1} + N_{3\_4\_R} \times P_{in\_3-2}] \times G_{3-2} \times L_3 \times G_{4-1}$$ (Expression 3)

Moreover, for example, when the number of channels $N_{1\_4\_R}$ does not change and the number of channels $N_{1\_3}$ changes due to the channel removal, the estimation section 32 uses (Expression 4) to estimate a local maximum value $P_{in\_total}'$ of the power of input signal light input into the optical receiver Rx_n.

$$P_{in\_total}' = [N_{1\_4\_R} \times P_{in\_1-2} \times G_{1-2}' \times L_1 \times G_{2-1}' \times G_{2-2} \times L_2 \times G_{3-1}' + N_{2\_4\_R} \times P_{in\_2-2} \times G_{2-2}' \times L_2 \times G_{3-1}' + N_{3\_4\_R} \times P_{in\_3-2}] \times G_{3-2} \times L_3 \times G_{4-1}$$ (Expression 4)

Moreover, for example, when the number of channels $N_{1\_4\_R}$ does not change and the number of channels $N_{1\_4\_O}$ changes due to the channel removal, the estimation section 32 uses (Expression 5) to estimate a local maximum value $P_{in\_total}'$ of the power of input signal light input into the optical receiver Rx_n.

$$P_{in\_total}'=[N_{1\_4\_R} \times P_{in\_1-2} \times G_{1-2}' \times L_1 \times G_{2-1}' \times G_{2-2}' \times L_2 \times G_{3-1}' + N_{2\_4\_R} \times P_{in\_2-2} \times G_{2-2}' \times L_2 \times G_{3-1}' + N_{3\_4\_R} \times P_{in\_3-2}] \times G_{3-2}' \times L_3 \times G_{4-1}'$$ (Expression 5)

Moreover, for example, when the number of channels $N_{1\_4\_R}$ changes to $N_{1\_4\_R}'$ due to the channel removal, the estimation section 32 uses (Expression 6) to estimate a local maximum value $P_{in\_total}'$ of the power of input signal light input into the optical receiver Rx_n.

$$P_{in\_total}'=[N_{1\_4\_R}' \times P_{in\_1-2} \times G_{1-2}' \times L_1 \times G_{2-1}' \times G_{2-2}' \times L_2 \times G_{3-1}' + N_{2\_4\_R} \times P_{in\_2-2} \times G_{2-2}' \times L_2 \times G_{3-1}' + N_{3\_4\_R} \times P_{in\_3-2}] \times G_{3-2}' \times L_3 \times G_{4-1}'$$ (Expression 6)

The estimation section 32 performs the following process when receiving a previous notice of channel removal noticing that channel removal will be performed in the WDM light transmitted through the path P#2 illustrated in FIG. 13.

In other words, the estimation section 32 reads management information such as path information and apparatus information from the management section 31, and specifies the path P#2 corresponding to a channel to be removed, based on the path information and information on the channel to be removed, which are included in the management information.

The estimation section 32 uses the path information included in the management information to acquire the number of channels of signal light input into optical amplifiers (optical amplifiers mounted to the nodes #2 to #4) on the path P#2 before the channel removal is performed (hereinafter, referred to as "the number of input channels of the optical amplifier before the channel removal").

The estimation section 32 uses the path information included in the management information to acquire the number of channels of signal light input into optical amplifiers (optical amplifiers mounted to the nodes #2 to #4) on the path P#2 after the channel removal is performed (hereinafter, referred to as "the number of input channels of the optical amplifier after the channel removal").

The estimation section 32 uses, for example, the an association table illustrated in FIG. 11 to acquire a gain variation amount of the optical amplifier after the channel removal that is associated with the number of input channels of the optical amplifier before the channel removal and the number of input channels of the optical amplifier after the channel removal.

Subsequently, the estimation section 32 adds the gain variation amount acquired from the association table to the gain $G_{m-n}$ of the optical amplifier to calculate a gain $G_{m-n}'$ of the optical amplifier after the channel removal.

Further, the estimation section 32 estimates, based on the gain $G_{m-n}'$ of the optical amplifier after the channel removal and the apparatus information included in the management information, a local maximum value $P_{in\_total}'$ of the power of input signal light input into the optical receiver Rx_n.

For example, when the number of channels $N_{2\_4\_R}$ does not change and the number of channels $N_{2\_3}$ changes due to the channel removal, the estimation section 32 uses (Expression 7) to estimate a local maximum value $P_{in\_total}'$ of the power of input signal light input into the optical receiver Rx_n.

$$P_{in\_total}'=[N_{1\_4\_R} \times P_{in\_1-2} \times G_{1-2}' \times L_1 \times G_{2-1}' \times G_{2-2}' \times L_2 \times G_{3-1}' + N_{2\_4\_R} \times P_{in\_2-2} \times G_{2-2}' \times L_2 \times G_{3-1}' + N_{3\_4\_R} \times P_{in\_3-2}] \times G_{3-2}' \times L_3 \times G_{4-1}$$ (Expression 7)

Moreover, for example, when the number of channels $N_{2\_4\_R}$ does not change and the number of channels $N_{2\_4\_O}$ changes due to the channel removal, the estimation section 32 uses (Expression 8) to estimate a local maximum value $P_{in\_total}'$ of the power of input signal light input into the optical receiver Rx_n.

$$P_{in\_total}'=[N_{1\_4\_R} \times P_{in\_1-2} \times G_{1-2}' \times L_1 \times G_{2-1} \times G_{2-2}' \times L_2 \times G_{3-1}' + N_{2\_4\_R} \times P_{in\_2-2} \times G_{2-2}' \times L_2 \times G_{3-1}' + N_{3\_4\_R} \times P_{in\_3-2}] \times G_{3-2}' \times L_3 \times G_{4-1}'$$ (Expression 8)

Moreover, for example, when the number of channels $N_{2\_4\_R}$ changes to $N_{2\_4\_R}'$ due to the channel removal, the estimation section 32 uses (Expression 9) to estimate a local maximum value $P_{in\_total}'$ of the power of input signal light input into the optical receiver Rx_n.

$$P_{in\_total}'=[N_{1\_4\_R} \times P_{in\_1-2} \times G_{1-2}' \times L_1 \times G_{2-1} \times G_{2-2}' \times L_2 \times G_{3-1}' + N_{2\_4\_R}' \times P_{in\_2-2} \times G_{2-2}' \times L_2 \times G_{3-1}' + N_{3\_4\_R} \times P_{in\_3-2}] \times G_{3-2}' \times L_3 \times G_{4-1}'$$ (Expression 9)

The estimation section 32 performs the following process when accepting a previous notice of channel removal noticing that channel removal will be performed in the WDM light transmitted through the path P#3 illustrated in FIG. 13.

In other words, the estimation section 32 reads out management information such as path information and apparatus information from the management section 31, and specifies the path P#3 corresponding to a channel to be removed based on the path information and information on the channel to be removed, which are included in the management information.

The estimation section 32 uses the path information included in the management information to acquire the number of channels of signal light input into optical amplifiers (optical amplifiers mounted to the nodes #3 to #4) on the path P#3 before the channel removal is performed (hereinafter, referred to as "the number of input channels of the optical amplifier before the channel removal").

The estimation section 32 uses the path information included in the management information to acquire the number of channels of signal light input into optical amplifiers (optical amplifiers mounted to the nodes #3 to #4) on the path P#3 after the channel removal is performed (hereinafter, referred to as "the number of input channels of the optical amplifier after the channel removal").

The estimation section 32 uses, for example, the an association table illustrated in FIG. 11 to acquire a gain variation amount of the optical amplifier after the channel removal that is associated with the number of input channels of the optical amplifier before the channel removal and the number of input channels of the optical amplifier after the channel removal.

Subsequently, the estimation section 32 adds the gain variation amount acquired from the association table to the gain $G_{m-n}$ of the optical amplifier to calculate a gain $G_{m-n}'$ of the optical amplifier after the channel removal.

Further, the estimation section 32 estimates, based on the gain $G_{m-n}'$ of the optical amplifier after the channel removal and the apparatus information included in the management information, a local maximum value $P_{in\_total}'$ of the power of input signal light input into the optical receiver Rx_n.

For example, when the number of channels $N_{3\_4\_R}$ does not change and the number of channels $N_{3\_4\_O}$ changes due to the channel removal, the estimation section 32 uses (Expression 10) to estimate a local maximum value $P_{in\_total}'$ of the power of input signal light input into the optical receiver Rx_n.

$$P_{in\_total}'=[N_{1\_4\_R} \times P_{in\_1-2} \times G_{1-2} \times L_1 \times G_{2-1} \times G_{2-2} \times L_2 \times G_{3-1} + N_{2\_4\_R} \times P_{in\_2-2} \times G_{2-2} \times L_2 \times G_{3-1} + N_{3\_4\_R} \times P_{in\_3-2}] \times G_{3-2}' \times L_3 \times G_{4-1}'$$ (Expression 10)

Moreover, for example, when the number of channels $N_{3\_4\_R}$ changes to $N_{3\_4\_R}'$ due to the channel removal, the estimation section 32 uses (Expression 11) to estimate a local maximum value $P_{in\_total}'$ of the power of input signal light input into the optical receiver Rx_n.

$$P_{in\_total}' = [N_{1\_4\_R} \times P_{in\_1-2} \times G_{1-2} \times L_1 \times G_{2-1} \times G_{2-2} \times L_2 \times G_{3-1} + N_{2\_4\_R} \times P_{in\_2-2} \times G_{2-2} \times L_2 \times G_{3-1} + N_{3\_4\_R} \times P_{in\_3-2}] \times G_{3-2}' \times L_3 \times G_{4-1}' \quad \text{(Expression 11)}$$

The description returns to the explanation for FIG. 9. When the estimation section 32 estimates an extreme value of the power of the input signal light, the calculation section 33 determines whether the estimated extreme value of the power of the input signal light falls within a tolerance level of the power of the input signal light in accordance with a tolerance level of the amplification section 110 in the optical receiver 100.

For example, when an extreme value of the power of the input signal light is a local maximum value, the calculation section 33 determines whether the local maximum value of the input signal light exceeds an upper limit value in the tolerance level of the power of the input signal light in accordance with the tolerance level of the amplification section 110 in the optical receiver 100.

For example, when an extreme value of the power of the input signal light is a local minimum value, the calculation section 33 determines whether the local minimum value of the input signal light is below a lower limit value in the tolerance level of the power of the input signal light in accordance with the tolerance level of the amplification section 110 in the optical receiver 100.

Note that, an upper limit value $P_{in\_total}'$ max in a tolerance level $P_{in\_total}$ of the power of the input signal light is calculated in accordance with an upper limit value $P_{in\_linear\_max}$ in a tolerance level $P_{in\_linear}$ of the amplification section 110 in the optical receiver 100, as indicated in (Expression 12).

Moreover, a lower limit value $P_{in\_total\_min}$ in the tolerance level $P_{in\_total}$ of the power of the input signal light is calculated in accordance with a lower limit value $P_{in\_linear\_min}$ in the tolerance level $P_{in\_linear}$ of the amplification section 110 in the optical receiver 100, as indicated in (Expression 13).

$$P_{in\_total} = [4 \times P_{in\_linear} - P_{LO} \times L_L]/L_S$$

$$P_{in\_total\_max} = [4 \times P_{in\_linear\_max} = P_{LO} \times L_L]/L_S \quad \text{(Expression 12)}$$

$$P_{in\_total\_min} = [4 \times P_{in\_linear\_min} - P_{LO} \times L_L]/L_S \quad \text{(Expression 13)}$$

Note that, in (Expression 12) and (Expression 13), $P_{LO}$ indicates the power of local light output from the LO 104 in the optical receiver 100.

$L_s$ indicates a loss from an input port of input signal light in the optical receiver 100 to the amplification section 110.

$L_L$ indicates a loss from the LO 104 in the optical receiver 100 to the amplification section 110.

When the extreme value of the power of the signal light is not within a tolerance level of the power of the input signal light in accordance with a tolerance level of the amplification section 110, the calculation section 33 calculates an adjustment amount such as an attenuation amount, based on the extreme value of the power of the input signal light, and an upper limit value or a lower limit value in the tolerance level of the power of the input signal light.

For example, when a local maximum value of the power of the input signal light exceeds an upper limit value in the tolerance level of the power of the input signal light in accordance with the tolerance level of the amplification section 110, the calculation section 33 calculates a difference value between the local maximum value of the power of the input signal light and the upper limit value in the tolerance level of the power of the input signal light, as an adjustment amount.

Moreover, for example, when a local minimum value of the power of the input signal light is below a lower limit value in the tolerance level of the power of the input signal light in accordance with the tolerance level of the amplification section 110, the calculation section 33 calculates a difference value between the local minimum value of the power of the input signal light and the lower limit value in the tolerance level of the power of the input signal light, as an adjustment amount.

When the calculation section 33 calculates an adjustment amount such as an attenuation amount, the notification section 34 notifies an optical receiver 100 to be adjusted of the calculated adjustment amount through a LAN or the like.

When the controller 112 in the optical receiver 100 to be adjusted receives the adjustment amount from the notification section 34 in the management apparatus 30, the controller 112 controls the adjustment amount of the power by the VOA 101 and/or the adjustment amount of the power by the VOA 105, based on the adjustment amount.

When the adjustment amount of the power by the VOA 101 is controlled, the VOA 101 adjusts the power of input signal light, and outputs the adjusted input signal light.

When the adjustment amount of the power by the VOA 105 is controlled, the VOA 105 adjusts the power of local light, and outputs the adjusted local light.

Accordingly, the power of mixed light of the input signal light and the local light is appropriately adjusted, so that the power of electric signals that are converted from the mixed light is also appropriately adjusted. This avoids a situation in which each power of the electric signals input into the amplification section 110 in the optical receiver 100 is not within the predetermined tolerance level. As a result, even in a case where the power of signal light transitionally fluctuates due to the change in the number of channels of WDM light, the ADC/DSP 111 applies digital signal processing to electric signals the waveform or the SN ratio of which is not deteriorated, which allows the lowering of the demodulation accuracy of the signal light to be moderated.

Moreover, the notification section 34 acquires, after change in the number of channels of WDM light is performed, a convergence value of the power of the input signal light that fluctuates due to the change in the number of channels from the controller 112 in the optical receiver 100.

When the acquired convergence value of the power of the input signal light falls within the tolerance level of the power of the input signal light, the notification section 34 notifies the optical receiver 100 to be adjusted of an invalidation instruction to invalidate the adjustment amount such as an attenuation amount is invalidated.

When the controller 112 in the optical receiver 100 to be adjusted receives the invalidation instruction from the management apparatus 30, the controller 112 performs control to invalidate the adjustment amount of the power by the VOA 101 and/or the adjustment amount of the power by the VOA 105, based on the received invalidation instruction.

Next, a processing operation of the optical transmission system in the embodiment will be described.

Figure 14:
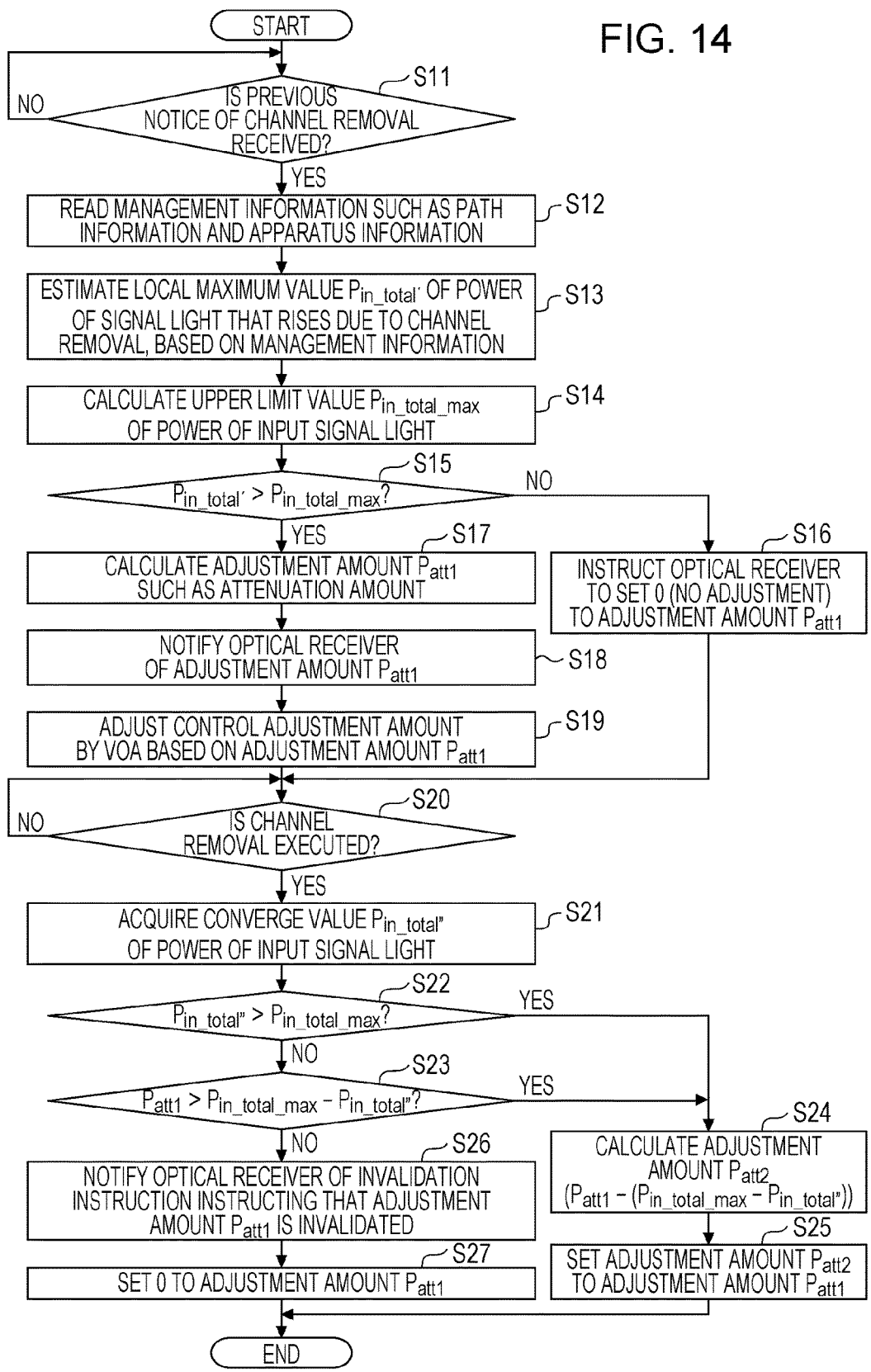
FIG. 14 is a flowchart illustrating an example of a processing operation of the optical transmission system related to a signal adjustment process in the embodiment.

FIG. 14 is a flowchart illustrating an example of a processing operation of the optical transmission system related to a signal adjustment process in the embodiment. Note that, in FIG. 14, the flow of processing to set an adjustment amount to the VOA 101 in the optical receiver 100 by the management apparatus 30 side when channel removal of WDM light is performed will be described. As illustrated in FIG. 14, the estimation section 32 in the management apparatus 30 waits if the estimation section 32 receives no previous notice of channel removal previously notifying that channel removal of WDM light is performed (Step S11; No).

On the other hand, if the estimation section 32 receives a previous notice of channel removal (Step S11; Yes), the estimation section 32 reads management information such as path information and apparatus information from the management section 31 (Step S12).

The estimation section 32 estimates a local maximum value $P_{in\_total}'$ of the power of input signal light that transitionally rises due to the channel removal, based on the read management information (Step S13).

The calculation section 33 calculates an upper limit value $P_{in\_total\_max}$ in a tolerance level of the power of the input signal light in accordance with an upper limit value $P_{in\_linear\_max}$ in a tolerance level of the amplification section 110 in the optical receiver 100 (Step S14).

The calculation section 33 determines whether the local maximum value $P_{in\_total}'$ of the power of the input signal light exceeds the upper limit value $P_{in\_total\_max}$ in the tolerance level of the power of the input signal light in accordance with the upper limit value $P_{in\_linear\_max}$ in the tolerance level of the amplification section 110 in the optical receiver 100 (Step S15).

If the local maximum value $P_{in\_total}'$ of the power of the input signal light is not more than the upper limit value $P_{in\_total\_max}$ in the tolerance level of the power of the input signal light (Step S15; No), the calculation section 33 performs the following processing. In other words, the calculation section 33 instructs the optical receiver 100 to set 0 (no adjustment) to an adjustment amount $P_{att1}$, such as an attenuation amount, of the VOA 101 in the optical receiver 100 (Step S16).

On the other hand, if the local maximum value $P_{in\_total}'$ of the power of the input signal light exceeds the upper limit value $P_{in\_total\_max}$ in the tolerance level of the power of the input signal light (Step S15; Yes), the calculation section 33 performs the following processing. In other words, the calculation section 33 calculates a difference value between the local maximum value $P_{in\_total}'$ of the power of input signal light and the upper limit value $P_{in\_total\_max}$ in the tolerance level of the power of the input signal light as an adjustment amount $P_{att1}$ such as an attenuation amount (Step S17).

When the calculation section 33 calculates an adjustment amount $P_{att1}$ such as an attenuation amount, the notification section 34 notifies the optical receiver 100 to be adjusted of the calculated adjustment amount $P_{att1}$ (Step S18).

When the controller 112 in the optical receiver 100 to be adjusted receives the adjustment amount $P_{att1}$ from the notification section 34 in the management apparatus 30, the controller 112 controls an adjustment amount of the power by the VOA 101 based on the adjustment amount $P_{att1}$ (Step S19).

Thereafter, when the channel removal is performed (Step S20; Yes), the notification section 34 in the management apparatus 30 acquires a convergence value $P_{in\_total}''$ of the power of the input signal light that rises due to the channel removal, from the controller 112 in the optical receiver 100 (Step S21).

If the acquired convergence value $P_{in\_total}''$ of the power of the input signal light exceeds the upper limit value $P_{in\_total\_max}$ in the tolerance level of the power of the input signal light (Step S22; Yes), the notification section 34 proceeds the processing to Step S24 because the adjustment amount $P_{att1}$ is insufficient.

The calculation section 33 calculates a value of ($P_{att1}$ − ($P_{in\_total\_max}$−$P_{in\_total}''$)) as an adjustment amount $P_{att2}$ such as an attenuation (Step S24).

When the calculation section 33 calculates an adjustment amount $P_{att2}$ such as an attenuation amount, the notification section 34 notifies the optical receiver 100 to be adjusted of the calculated adjustment amount $P_{att2}$.

When the controller 112 in the optical receiver 100 to be adjusted receives the adjustment amount $P_{att2}$ from the notification section 34 in the management apparatus 30, the controller 112 sets the adjustment amount $P_{att2}$ to the adjustment amount $P_{att1}$, and controls an adjustment amount of the power by the VOA 101 based on the adjustment amount $P_{att2}$ (Step S25).

On the other hand, the acquired convergence value $P_{in\_total}''$ of the power of the input signal light is not more than the upper limit value $P_{in\_total\_max}$ in the tolerance level of the power of the input signal light (Step S22; No), the notification section 34 performs the following determination.

In other words, the notification section 34 determines whether the adjustment amount $P_{att1}$ exceeds ($P_{in\_total\_max}$−$P_{in\_total}''$) (Step S23).

If the adjustment amount $P_{att1}$ exceeds ($P_{in\_total\_max}$−$P_{in\_total}''$) (Step S23; Yes), the notification section 34 proceeds the processing to Step S24.

On the other hand, if the adjustment amount $P_{att1}$ is not more than ($P_{in\_total\_max}$−$P_{in\_total}''$) (Step S23; No), the notification section 34 notifies the optical receiver 100 to be adjusted of an invalidation instruction to invalidate the adjustment amount $P_{att1}$ such as the attenuation amount is invalidated (Step S26).

When the controller 112 in the optical receiver 100 to be adjusted receives the invalidation instruction from the management apparatus 30, the controller 112 sets 0 to the adjustment amount $P_{att1}$ such as the attenuation amount based on the received invalidation instruction (Step S27).

As in the foregoing, in the optical transmission system in the embodiment, the management apparatus 30 estimates an extreme value of the power of input signal light that fluctuates due to change in the number of channels of WDM light, based on management information for each node.

When the estimated extreme value of the power of the signal light is not within a tolerance level of the power of the input signal light in accordance with a tolerance level of the amplification section in the optical receiver, the management apparatus 30 calculates an adjustment amount such as an attenuation amount, based on a difference between the extreme value of the power of the input signal light, and an upper limit value or a lower limit value in the tolerance level of the power of the input signal light.

The management apparatus 30 notifies an optical receiver 100 to be adjusted of the calculated adjustment amount. The optical receiver 100 to be adjusted adjusts the power of input signal light or local light, based on the adjustment amount notified by the management apparatus 30.

Accordingly, the power of mixed light of the input signal light and the local light is appropriately adjusted, so that the power of electric signals that is converted from the mixed light is also appropriately adjusted.

This avoids a situation in which each power of the electric signals input into the amplification section 110 in the optical receiver 100 is not within the predetermined tolerance level. As a result, with the embodiment, even in a case where the power of signal light transitionally fluctuates due to the change in the number of channels of WDM light, digital signal processing is applied to electric signals the waveform or the SN ratio of which is not deteriorated, which allows the lowering of the demodulation accuracy of the signal light to be moderated.

Moreover, with the optical transmission system in the embodiment, the management apparatus 30 invalidates the adjustment amount in a case after the change in the number of channels of WDM light is performed, a convergence value of the power of the signal light that fluctuates due to the change in the number of channels falls within the tolerance level of the power of the signal light.

As a result, the embodiment may cause a value of each power of the electric signals input into the amplification section 110 in the optical receiver 100 to be recovered to a value before the adjustment in the power of the input signal light or the local light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system, comprising:
    a reception apparatus configured to receive signal light separated from wavelength division multiplexing light; and
    a management apparatus configured to manage a plurality of optical transmission apparatuses that transmit the wavelength division multiplexing light, wherein
    the reception apparatus further comprises:
    an amplification section configured to amplify each power of electric signals for demodulating the signal light within a predetermined tolerance level, the electric signals being converted from mixed light of local light and the signal light input into the reception apparatus,
    an adjustment section configured to adjust at least one of power of the signal light input into the reception apparatus and power of the local light, and
    a controller configured to control the adjustment section based on an adjustment amount notified by the management apparatus,
    the management apparatus includes a computer, and
    the computer is configured to perform:
    an estimation process to estimate, when a number of channels of the wavelength division multiplexing light is to be changed, an extreme value of the power of the signal light that fluctuates due to the change based on management information for each of the optical transmission apparatuses;
    a calculation process to calculate the adjustment amount, when the extreme value of the power of the signal light is not within a tolerance level of the power of the signal light in accordance with the tolerance level of the amplification section, based on the extreme value of the power of the signal light, and an upper limit value or a lower limit value in the tolerance level of the power of the signal light; and
    a notification process to notify the reception apparatus of the adjustment amount calculated by the calculation process.

2. The optical transmission system according to claim 1, wherein
    the management information comprises, for each of types of the optical transmission apparatuses, a gain of an optical amplifier that is mounted in the optical transmission apparatus and amplifies the wavelength division multiplexing light, average power of channels that are inserted by the optical transmission apparatus out of the channels of the wavelength division multiplexing light, the number of channels of the wavelength division multiplexing light that are inserted by a different optical transmission apparatus upstream of the optical transmission apparatus and are separated as the signal light by the optical transmission apparatus, and a loss of an optical transmission path that connects the optical transmission apparatus to an adjacent optical transmission apparatus, and
    the estimation process is to estimate the extreme value of the power of the signal light based on the gain of the optical amplifier, the average power of the channels, the number of the channels, and the loss of the optical transmission path.

3. The optical transmission system according to claim 1, wherein
    the notification process is to acquire a convergence value of the power of the signal light that fluctuates due to the change after the number of the channels of the wavelength division multiplexing light is changed, and notify the reception apparatus of an invalidation instruction to invalidate the adjustment amount, if the acquired convergence value of the power of the signal light falls within the tolerance level of the power of the signal light, and
    the controller performs control to invalidate the adjustment amount, based on the invalidation instruction.

4. A reception apparatus that receives signal light separated from wavelength division multiplexing light, the reception apparatus comprising:
    an amplification section configured to amplify each power of electric signals for demodulating the signal light within a predetermined tolerance level, the electric signals being converted from mixed light of local light and the signal light input into the reception apparatus;
    an adjustment section configured to adjust power of the signal light input into the reception apparatus or power of the local light; and
    a controller configured to control the adjustment section based on an adjustment amount notified by a management apparatus under conditions where the management apparatus that includes a computer to manage a plurality of optical transmission apparatuses transmitting the wavelength division multiplexing light, and to estimate, when a number of channels of the wavelength division multiplexing light is to be changed, an extreme value of the power of the signal light that fluctuates due to the change based on management information for each of the optical transmission apparatuses, calculate the adjustment amount to be used for an adjustment in the adjustment section in the reception apparatus, when the extreme value of the power of the signal light is not within a tolerance level of the power of the signal light in accordance with the tolerance level of the amplification section, based on the extreme value of the power of the signal light and an upper limit value or a lower limit value in the tolerance level of the power of the signal light, and to notify the reception apparatus of the calculated adjustment amount.

5. A signal adjustment method of an optical transmission system including: a reception apparatus that receives signal light separated from wavelength division multiplexing light; and a management apparatus that includes a computer to manage a plurality of optical transmission apparatuses transmitting the wavelength division multiplexing light, the signal adjustment method comprising, executed by the computer:

estimating, when a number of channels of the wavelength division multiplexing light is to be changed, an extreme value of the power of the signal light that fluctuates due to the change based on management information for each of the optical transmission apparatuses;

when the extreme value of the power of the signal light is not within a tolerance level of the power of the signal light in accordance with a predetermined tolerance level of an amplification section in the reception apparatus, the amplification section amplifying each power of electric signals for demodulating the signal light within the predetermined tolerance level, the electric signals being converted from mixed light of local light and the signal light input into the reception apparatus, calculating an adjustment amount to be used for an adjustment in the adjustment section in the reception apparatus based on the extreme value of the power of the signal light, and an upper limit value or a lower limit value in the tolerance level of the power of the signal light; and notifying the reception apparatus of the adjustment amount, and the signal adjustment method including, executed by the reception apparatus:

amplifying each power of the electric signals for demodulating the signal light using the amplification section, the electric signals being converted from the mixed light of the local light and the signal light input into the reception apparatus; and controlling the adjustment section that adjusts the power of the signal light input into the reception apparatus or power of the local light, based on the adjustment amount notified by the management apparatus.

* * * * *